(12) United States Patent
Lee et al.

(10) Patent No.: US 10,578,787 B2
(45) Date of Patent: Mar. 3, 2020

(54) HOLOGRAM GENERATING METHOD AND HOLOGRAM GENERATING APPARATUS

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Jin-sung Lee, Suwon-si (KR); YongMan Ro, Daejeon (KR); Hak Gu Kim, Daejeon (KR); Jong-sul Min, Hwaseong-si (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 269 days.

(21) Appl. No.: 15/629,163

(22) Filed: Jun. 21, 2017

(65) Prior Publication Data

US 2018/0143588 A1     May 24, 2018

(30) Foreign Application Priority Data

Nov. 24, 2016     (KR) .......................... 10-2016-0157249

(51) Int. Cl.
   *G02B 5/32*     (2006.01)
(52) U.S. Cl.
   CPC ...................................... *G02B 5/32* (2013.01)
(58) Field of Classification Search
   None
   See application file for complete search history.

(56) References Cited

U.S. PATENT DOCUMENTS

2011/0310448 A1*  12/2011  Kim .................... G03H 1/0808
                                                                  359/9
2015/0131133 A1    5/2015  Tsang

FOREIGN PATENT DOCUMENTS

JP      2014215547 A    11/2014
KR   1020090088047 A     8/2009
           (Continued)

OTHER PUBLICATIONS

Hak Gu Kim, et al.; "Acceleration of the calculation speed of computer-generated holograms using the sparsity of the holographic fringe pattern for a 3D object", Optical Society of America 2016, Total 12 pages.

*Primary Examiner* — Darryl J Collins
*Assistant Examiner* — Journey F Sumlar
(74) *Attorney, Agent, or Firm* — Sughrue Mion, PLLC

(57) ABSTRACT

A hologram generating apparatus is provided. The apparatus includes a hologram signal generating unit configured to, based on light projected on at least some points corresponding to an object, generate a hologram signal corresponding to the at least some points on at least one two-dimensional plane, a processor configured to calculate a sparsity corresponding to the two-dimensional plane based on the hologram signal, and to calculate a fringe pattern based on at least some of the hologram signal, and a pattern writing unit configured to record the fringe pattern on a computer-generated holography (CGH) plane, wherein the processor is further configured to repeatedly calculate a fringe pattern until a number of dominant signals of the calculated fringe pattern coincides with a predetermined threshold value determined based on the sparsity.

20 Claims, 11 Drawing Sheets

(56) References Cited

FOREIGN PATENT DOCUMENTS

| KR | 101169367 B1 | 7/2012 |
|---|---|---|
| KR | 101421984 B1 | 7/2014 |
| KR | 1020140125038 A | 10/2014 |

\* cited by examiner

OBJECT    VIRTUAL PLANE    CGH PLANE

HOLOGRAM GENERATING METHOD AND HOLOGRAM GENERATING APPARATUS

CROSS-REFERENCE TO RELATED APPLICATION

This application is based on and claims priority under 35 U.S.C. § 119 to Korean Patent Application No. 10-2016-0157249, filed in the Korean Intellectual Property Office on Nov. 24, 2016, the disclosure of which is incorporated by reference herein in its entirety.

BACKGROUND

1. Field

The present disclosure relates generally to a hologram generating method and a hologram generating apparatus, and for example to a method for generating a hologram based on a fringe pattern and a hologram generating apparatus.

2. Description of Related Art

Due to the recent development of 3D display technology, 3D images are utilized in various industrial fields. Particularly, research on holograms that reproduce objects as real objects is being actively carried out, and content using holograms is being produced in various fields such as broadcasting, exhibition, and performance.

A hologram reproduces an object by using the phenomenon of light interference. Methods of hologram generation include an analog method and a digital method.

In the analog method, a hologram can be generated by storing an interference fringe between a reference light directly reflected on a recording medium and an object light reflected from an object on a recording medium. Recently, a computer-generated hologram (CGH) method, which generates a hologram without using two light sources, has been developed due to the development of computer technology.

However, since the CGH method artificially generates the hologram without using the reference light and the object light, a tremendous amount of computation must be performed, which requires a long computation time.

SUMMARY

Aspects of the present disclosure are provided to address at least the above-mentioned problems and/or disadvantages and to provide at least the advantages described below. Accordingly, an example aspect of the present disclosure is to provide a hologram generating method for generating a fringe pattern based on sparsity rather than all points constituting an object and a hologram generating apparatus.

According to an aspect of an example embodiment, a method of generating a digital hologram of an object using a point cloud method includes projecting light to at least some points corresponding to the object, generating a hologram signal corresponding to the at least some points on at least one two-dimensional plane based on the projected light, calculating a sparsity corresponding to the two-dimensional plane based on the hologram signal, calculating a fringe pattern based on at least a portion of the hologram signal, and recording the fringe pattern on a computer-generated holography (CGH) plane, wherein the calculating the fringe pattern comprises the calculation until the number of dominant signals of the calculated fringe pattern coincides with a predetermined threshold value determined based on the sparsity.

The generating the hologram signal may include dividing the object into a plurality of depth layers, and generating a hologram signal corresponding to a plurality of points included in each of the plurality of depth layers on the two-dimensional plane corresponding to each of the plurality of depth layers, wherein the sparsity may be a ratio of a number of points included in each depth layer to a total number of points included in the object.

A distance between the plurality of depth layers may be determined based on a total number of points included in the object.

The calculating the fringe pattern may include generating the fringe pattern by applying the following equation to at least a part of the hologram signal.

$$u(\xi, \eta) = \sum_{k=1}^{n} \frac{\exp\left(j\frac{2\pi}{\lambda}z_k\right)}{j\lambda z_k} \int\int u_k(x, y)\exp$$

$$\left(j\frac{\pi}{\lambda z_k}((\xi - x)^2 + (\eta - y)^2)\right)dxdy$$

$$\approx \sum_{k=1}^{n} \frac{\exp\left(j\frac{2\pi}{\lambda}z_k\right)}{j\lambda z_k}SF^{-1}[SF[u_k(\xi, \eta)] \cdot$$

$$SF[h(\xi, \eta)]],$$

where $z_k$ is a distance been a kth depth layer and a CGH plane among the plurality of depth layers, $u_k(x,y)$ is a signal value of a kth depth layer coordinate among the plurality of depth layers, SF is a sparse Fourier transform formula, $SF^{-1}$ s a sparse Fourier inverse formula, $\xi$ and $\eta$ are CGH plane coordinate values, and $h(\xi, \eta)$ is an impulse response function.

According to another aspect of the present disclosure, the generating the hologram signal may include generating a hologram signal corresponding to all points included in the object on a virtual two-dimensional plane present between the object and the CGH plane, and the sparsity may be a number of dominant hologram signals satisfying a predetermined condition among the hologram signals generated in the virtual two-dimensional plane.

A resolution of the virtual two-dimensional plane may be implemented with a lower resolution than a resolution of the CGH plane.

The generating the hologram signal may include dividing all points included in the object into a plurality of clusters, and generating a hologram signal for each of the plurality of clusters in parallel on a corresponding region on the two-dimensional plane.

The generating the hologram signal may include generating the hologram signal based on the following equation:

$$u_{vp}(x, y) = \sum_{t=1}^{S} \sum_{i=1}^{N_t} \frac{A_t^i}{R_t^i}\exp(jkR_t^i)$$

where $R_t^i$ is a distance between the object and the virtual two-dimensional plane and is calculated as $R_t^i = \sqrt{(x-x_t^i)^2+(y-y_t^i)^2+(z_t^i)^2}$, x and y are coordinate values of the virtual two-dimensional plane, $x_t^i$, $y_t^i$ and $z_t^i$ are coordinate values for an i-th point in a t-th cluster, k is a frequency of a reference light, and $A_t^i$ is an intensity of light at the i-th point present in the t-th cluster.

The calculating the fringe pattern may include calculating the fringe pattern by applying the following equation to at least a part of the hologram signal.

$$u(\xi, \eta) = \frac{\exp\left(j\frac{2\pi}{\lambda}z_2\right)}{j\lambda z_2} \int\int u_{VP}(x, y)\exp$$

$$\left(j\frac{\pi}{\lambda z_2}((\xi - x)^2 + (\eta - y)^2)\right)dxdy$$

$$\approx \frac{\exp\left(j\frac{2\pi}{\lambda}z_2\right)}{j\lambda z_2} SF^{-1}[SF[u_{VP}(\xi, \eta)] \cdot$$

$$SF[h(\xi, \eta)]],$$

where $z^2$ is a distance between the virtual two-dimensional plane and a CGH plane, $u_{VP}(x,y)$ is a signal value of the virtual two-dimensional plane (x, y) coordinates, SF is a sparse Fourier transform formula, $SF^{-1}$ is a sparse Fourier inverse transform formula, $\xi$ and $\eta$ are CGH plane coordinate values, and $h(\xi,\eta)$ is an impulse response function.

On the other hand, the recording on the CGH plane may include recording only a fringe pattern having an amplitude of a predetermined threshold or more among the calculated fringe patterns on the CGH plane.

According to an aspect of an example embodiment, a hologram generating apparatus includes a hologram signal generating unit configured to, based on light projected on at least some points corresponding to an object, generate a hologram signal corresponding to the at least some points on at least one two-dimensional plane, a processor configured to calculate a sparsity corresponding to the two-dimensional plane based on the hologram signal, and to calculate a fringe pattern based on at least some of the hologram signal, and a pattern writing unit configured to record the fringe pattern on a computer-generated holography (CGH) plane, wherein the processor is further configured to repeatedly calculate a fringe pattern until a number of dominant signals of the calculated fringe pattern coincides with a predetermined threshold value determined based on the sparsity.

The hologram signal generating unit may divide the object into a plurality of depth layers and generate a hologram signal corresponding to a plurality of points included in each of the plurality of depth layers on the two-dimensional plane corresponding to each of the plurality of depth layers, and the sparsity may be a ratio of a number of points included in each depth layer to a total number of points included in the object.

A distance between the plurality of depth layers may be determined based on a total number of points included in the object.

The processor may generate the fringe pattern by applying the following equation to at least a part of the hologram signal.

$$u(\xi, \eta) = \sum_{k=1}^{n} \frac{\exp\left(j\frac{2\pi}{\lambda}z_k\right)}{j\lambda z_k} \int\int u_k(x, y)\exp$$

$$\left(j\frac{\pi}{\lambda z_k}((\xi - x)^2 + (\eta - y)^2)\right)dxdy$$

-continued $$\approx \sum_{k=1}^{n} \frac{\exp\left(j\frac{2\pi}{\lambda}z_k\right)}{j\lambda z_k} SF^{-1}[SF[u_k(\xi, \eta)] \cdot$$

$$SF[h(\xi, \eta)]],$$

where $z_k$ is a distance between a kth depth layer and a CGH plane among the plurality of depth layers, $u_k(x,y)$ is a signal value of a kth depth layer (x, y) coordinate among the plurality of depth layers, SF is a sparse Fourier transform formula, $SF^{-1}$ is a sparse Fourier inverse transform formula, $\xi$ and $\eta$ are CGH plane coordinate values, and $h(\xi,\eta)$ is an impulse response function.

Meanwhile, the hologram signal generating unit may generate a hologram signal corresponding to all points included in the object on a virtual two-dimensional plane present between the object and the CGH plane, and the sparsity may be a number of dominant hologram signals satisfying a predetermined condition among the hologram signal generated on the virtual two-dimensional plane.

A resolution of the virtual two-dimensional plane may be implemented with a lower resolution than a resolution of the CGH plane.

In addition, the hologram signal generating unit may divide all points included in the object into a plurality of clusters and generate a hologram signal for each of the plurality of clusters in parallel on a corresponding region on the two-dimensional plane.

The hologram signal generating unit may generate the hologram signal based on the following equation.

$$u_{vp}(x, y) = \sum_{t=1}^{S} \sum_{i=1}^{N_t} \frac{A_t^i}{R_t^i}\exp(jkR_t^i),$$

where $R_t^i$ is a distance between the object and the virtual two-dimensional plane and is calculated as $R_t^i = \sqrt{(x-x_t^i)^2 + (y-y_t^i)^2 + (z_t^i)^2}$, x and y are coordinate values of the virtual two-dimensional plane, $x_t^i$, $y_t^i$ and $z_t^i$ are coordinate values for an i-th point in a t-th cluster, k is a frequency of a reference light, and $A_t^i$ is an intensity of light at the i-th point in the t-th cluster.

The processor may calculate a fringe pattern by applying the following equation to at least some of the hologram signal.

$$u(\xi, \eta) = \frac{\exp\left(j\frac{2\pi}{\lambda}z_2\right)}{j\lambda z_2} \int\int u_{VP}(x, y)\exp$$

$$\left(j\frac{\pi}{\lambda z_2}((\xi - x)^2 + (\eta - y)^2)\right)dxdy$$

$$\approx \frac{\exp\left(j\frac{2\pi}{\lambda}z_2\right)}{j\lambda z_2} SF^{-1}[SF[u_{VP}(\xi, \eta)] \cdot$$

$$SF[h(\xi, \eta)]]$$

where $z_2$ is a distance been the virtual two-dimensional plane and a CGH plane, $u_{VP}(x,y)$ is a signal value of a virtual two-dimensional plane (x, y) coordinates, SF is a sparse Fourier transform formula, $SF^{-1}$ is a sparse Fourier inverse transform formula, ξ and η are CGH plane coordinate values, and h(ξ,η) is an impulse response function.

In addition, the pattern writing unit may record only a fringe pattern having am amplitude of a predetermined threshold or more among the calculated fringe patterns on the CGH plane.

According to another aspect of an example embodiment, in a non-transitory recording medium storing a program for performing a method of generating a digital hologram of an object using a point cloud method, the method may include projecting light to at least some points corresponding to the object, generating a hologram signal corresponding to the at least some points on at least one two-dimensional plane based on the projected light, calculating a sparsity corresponding to the two-dimensional plane based on the hologram signal, calculating a sparsity corresponding to the two-dimensional plane based on the hologram signal, and recording the fringe pattern on a computer-generated holography (CGH) plane, wherein the calculating the fringe pattern comprises the calculation until a number of dominant signals of the calculated fringe pattern coincides with a predetermined threshold value determined based on the sparsity.

According to another aspect of an example embodiment, a method of generating a digital hologram of an object using a point cloud method includes projecting light to a plurality of points corresponding to the object, generating a hologram signal corresponding to the plurality of points, the hologram signal being generated on at least one two-dimensional plane, the generating being based on the projected light, calculating a sparsity corresponding to one of the at least one two-dimensional plane based on the hologram signal, calculating a fringe pattern based on at least a portion of the hologram signal, and recording the fringe pattern on a computer-generated holography (CGH) plane, wherein the calculating the fringe pattern comprises repeatedly calculating the fringe pattern until a number of dominant signals of the calculated fringe pattern is greater than or equal to a predetermined threshold value determined based on the sparsity.

The generating the hologram signal may include dividing the object into a plurality of depth layers; and generating the hologram signal corresponding to a plurality of points, multiple sets of the plurality of points being included in the plurality of depth layers, the hologram signal being generated on the at least one two-dimensional plane corresponding to each of the plurality of depth layers, wherein the sparsity is a ratio of a number of points included in one of the plurality of depth layers to a total number of points included in the object.

A first depth layer may be provided a predetermined distance from an adjacent second depth layer, and the predetermined distance between the first depth layer and the second depth layer may be determined based on a total number of points included in the object.

The calculating the fringe pattern may include generating the fringe pattern by applying the following equation to at least a part of the hologram signal:

$$u(\xi, \eta) = \sum_{k=1}^{n} \frac{\exp\left(j\frac{2\pi}{\lambda}z_k\right)}{j\lambda z_k} \int\int u_k(x, y)\exp\left(j\frac{\pi}{\lambda z_k}((\xi-x)^2 + (\eta-y)^2)\right)dxdy$$

$$\approx \sum_{k=1}^{n} \frac{\exp\left(j\frac{2\pi}{\lambda}z_k\right)}{j\lambda z_k} SF^{-1}[SF[u_k(\xi, \eta)] \cdot SF[h(\xi, \eta)]],$$

where $z_k$ is a distance between a k-th depth layer among the plurality of depth layers and a CGH plane, $u_k(x,y)$ is a signal value of a coordinate of the k-th depth layer among the plurality of depth layers, SF is a sparse Fourier transform formula, $SF^{-1}$ is a sparse Fourier inverse transform formula, ξ and η are CGH plane coordinate values, and h(ξ,72 ) is an impulse response function.

The generating the hologram signal may include generating a hologram signal on a virtual two-dimensional plane present between the object and the CGH plane, the hologram signal corresponding to all points included in the object, and wherein the sparsity is a number of dominant hologram signals among the hologram signals generated on the virtual two-dimensional plane, the dominant hologram signals satisfying a predetermined condition.

The virtual two-dimensional plane may be implemented with a lower resolution than a resolution of the CGH plane.

The generating the hologram signal may include dividing all points included in the object into a plurality of clusters, and generating a hologram signal for each of the plurality of clusters in parallel on a corresponding region on the two-dimensional plane.

The generating the hologram signal may include generating the hologram signal based on the following equation:

$$u_{vp}(x, y) = \sum_{t=1}^{S} \sum_{i=1}^{N_t} \frac{A_t^i}{R_t^i}\exp(jkR_t^i),$$

where $R_t^i$ is a distance between the object and the virtual two-dimensional plane and is calculated as $R_t^i = \sqrt{(x-x_t^i)^2+(y-y_t^i)^2+(z_t^i)^2}$, x and y are coordinate values of the virtual two-dimensional plane, $x_t^i$, $y_t^i$ and $z_t^i$ are coordinate values for an i-th point in a t-th cluster, k is a frequency of a reference light, and $A_t^i$ is an intensity of light at the i-th point present in the t-th cluster.

The calculating the fringe pattern may include calculating the fringe pattern by applying the following equation to at least a part of the hologram signal:

$$u(\xi, \eta) = \frac{\exp\left(j\frac{2\pi}{\lambda}z_2\right)}{j\lambda z_2} \int\int u_{VP}(x, y)\exp\left(j\frac{\pi}{\lambda z_2}((\xi-x)^2 + (\eta-y)^2)\right)dxdy$$

$$\approx \frac{\exp\left(j\frac{2\pi}{\lambda}z_2\right)}{j\lambda z_2} SF^{-1}[SF[u_{VP}(\xi, \eta)] \cdot SF[h(\xi, \eta)]],$$

where $z_2$ is a distance between the virtual two-dimensional plane and the) CGH plane, $u_{VP}(x,y)$ is a signal value of the virtual two-dimensional plane (x, y) coordinates, SF is a sparse Fourier transform formula, $SF^{-1}$ is a sparse Fourier inverse transform formula, $\xi$ and $\eta$ are CGH plane coordinate values, and $h(\xi,\eta)$ is an impulse response function.

The recording on the CGH plane may include recording only a fringe pattern among the calculated fringe patterns on the CGH plane having an amplitude of a predetermined threshold or more.

Acccording to an aspect of an example embodiment, a hologram generating apparatus includes a hologram signal generating unit configured to, based on light projected to a plurality of points corresponding to an object, generate a hologram signal corresponding to the plurality of points, the hologram signal being generated on at least one two-dimensional plane, a processor configured to calculate a sparsity corresponding to one of the at least one two-dimensional plane based on the hologram signal, and to calculate a fringe pattern based on at least a portion of the hologram signal, and a pattern writing unit configured to record the fringe pattern on a computer-generated holography (CGH) plane, wherein the processor is further configured to repeatedly calculate a fringe pattern until a number of dominant signals of the calculated fringe pattern is greater than or equal to a predetermined threshold value determined based on the sparsity.

The hologram signal generating unit may divide the object into a plurality of depth layers and generate the hologram signal corresponding to a plurality of points, multiple sets of the plurality of points being included in the plurality of depth layers, the hologram signal being generated on the at least one two-dimensional plane corresponding to each of the plurality of depth layers, and the sparstiy may be a ratio of a number of points included in one of the plurality of depth layers to a total number of points included in the object.

A first depth layer may be provided a predetermined distance from an adjacent second depth layer, and the predetermined distance between the first depth layer and the second depth layer may be determined based on a total number of points included in the object.

The processor may generate the fringe pattern by applying the following equation to at least a part of the hologram signal:

$$u(\xi, \eta) = \sum_{k=1}^{n} \frac{\exp\left(j\frac{2\pi}{\lambda}z_k\right)}{j\lambda z_k} \int\int u_k(x, y)\exp$$

$$\left(j\frac{\pi}{\lambda z_k}((\xi - x)^2 + (\eta - y)^2)\right)dxdy$$

$$\approx \sum_{k=1}^{n} \frac{\exp\left(j\frac{2\pi}{\lambda}z_k\right)}{j\lambda z_k} SF^{-1}[SF[u_k(\xi, \eta)] \cdot$$

$$SF[h(\xi, \eta)]],$$

where $z_k$ is a distance between a k-th depth layer among the plurality of depth layers and a CGH plane, $u_k(x,y)$ is a signal value of a coordinate of the k-th depth layer $(x, y)$ among the plurality of depth layers, SF is a sparse Fourier transform formula, $SF^{-1}$ is a sparse Fourier inverse transform formula, $\xi$ and $\eta$ are CGH plane coordinate values, and $h(\xi,\eta)$ is an impulse response function.

The hologram signal generating unit may generate a hologram signal on a virtual two-dimensional plane present between the object and the CGH plane, the hologram signal corresponding to all points included in the object, and the sparsity may be a number of dominant hologram signals among the hologram signals generated on the virtual two-dimensional plane, the dominant hologram signals satisfying a predetermined condition.

The virtual two-dimensional plane may be implemented with a lower resolution than a resolution of the CGH plane.

The hologram signal generating unit may divide all points included in the object into a plurality of clusters and generate a hologram signal for each of the plurality of clusters in parallel on a corresponding region on the two-dimensional plane.

The hologram signal generating unit may generate the hologram signal based on the following equation:

$$u_{VP}(x, y) = \sum_{t=1}^{S} \sum_{i=1}^{N_t} \frac{A_t^i}{R_t^i}\exp(jkR_t^i),$$

where $R_t^i$ is a distance between the object and the virtual two-dimensional plane and is calculated as $R_t^i = \sqrt{(x-x_t^i)^2+(y-y_t^i)^2+(z_t^i)^2}$, x and y are coordinate values of the virtual two-dimensional plane, $x_t^i$, $y_t^i$ and $z_t^i$ are coordinate values for an i-th point in a t-th cluster, k is a frequency of a reference light, and $A_t^i$ is an intensity of light at the i-th point in the t-th cluster.

The processor may calculate a fringe pattern by applying the following equation to at least some of the hologram signal:

$$u(\xi, \eta) = \frac{\exp\left(j\frac{2\pi}{\lambda}z_2\right)}{j\lambda z_2} \int\int u_{VP}(x, y)\exp$$

$$\left(j\frac{\pi}{\lambda z_2}((\xi - x)^2 + (\eta - y)^2)\right)dxdy$$

$$\approx \frac{\exp\left(j\frac{2\pi}{\lambda}z_2\right)}{j\lambda z_2} SF^{-1}[SF[u_{VP}(\xi, \eta)] \cdot$$

$$SF[h(\xi, \eta)]],$$

where $z_2$ is a distance been the virtual two-dimensional plane and the CGH plane, $u_{VP}(x,y)$ is a signal value of a virtual two-dimensional plane $(x, y)$ coordinates, SF is a sparse Fourier transform formula, $SF^{-1}$ is a sparse Fourier inverse transform formula, $\xi$ and $\eta$ are CGH plane coordinate values, and $h(\xi,\eta)$ is an impulse response function.

According to another aspect of an example embodiment, in a non-transitory recording medium storing a program for performing a method of generating a digital hologram of an object using a point cloud method, the method may include projecting light to a plurality of points corresponding to the object, generating a hologram signal corresponding to the plurality of points, the hologram signal being generated on at least one two-dimensional plane, the generating being based on the projected light, calculating a sparsity corresponding to one of the at least one two-dimensional plane based on the hologram signal, calculating a fringe pattern based on at least a portion of the hologram signal, and recording the fringe pattern on a computer-generated holography (CGH) plane, wherein the calculating the fringe pattern comprises repeatedly calculating the fringe pattern until a number of dominant signals of the calculated fringe pattern is greater than or equal to a predetermined threshold value determined based on the sparsity.

According to various embodiments of the present disclosure, it is possible to reduce the amount of computation and computation time in generating a hologram for an object.

BRIEF DESCRIPTION OF THE DRAWINGS

The above and other aspects of one or more exemplary embodiments will become more apparent by reference to specific embodiments thereof which are illustrated in the appended drawings. Understanding that these drawings depict only exemplary embodiments of the disclosure and are not therefore to be considered to be limiting of the scope of the disclosure, the principles herein are described and explained with additional specificity and detail through the use of the accompanying drawings, in which.

DETAILED DESCRIPTION

Hereinafter, the present disclosure will be described in detail with reference to the accompanying drawings.

Figure 1:
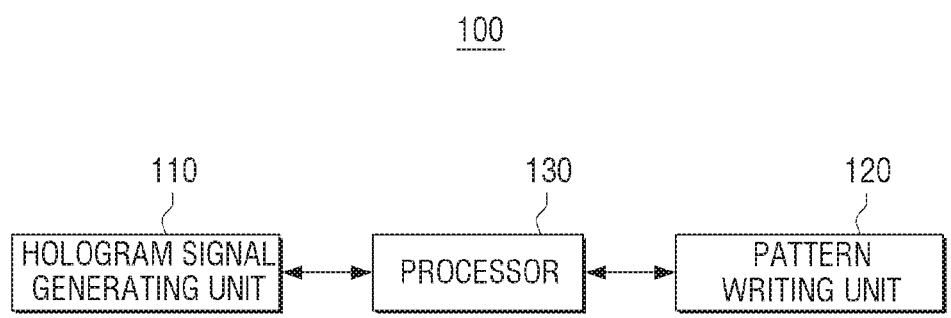
FIG. 1 is a block diagram illustrating a configuration of a hologram generating apparatus according to an exemplary embodiment.

FIG. 1 is a block diagram illustrating a configuration of a hologram generating apparatus according to an exemplary embodiment.

According to FIG. 1, the hologram generating apparatus 100 may include a hologram signal generating unit 110, a pattern writing unit 120, and a processor 130.

The hologram generating apparatus 100 according to an example embodiment of the present disclosure may generate a digital hologram of an object using a point cloud method.

A point cloud method is a method of generating a hologram using a plurality of points existing on an object surface, and an object may be assumed to be an aggregate of a plurality of points. Here, the object may generally be a three-dimensional object, but it is not necessarily limited thereto, and may be various types of matter for generating a hologram.

The hologram signal generating unit 110 may generate a hologram signal by illuminating the object with light. When the hologram signal generating unit 110 illuminates the object, a plurality of hologram signals having a plurality of points as a source on the object surface may be generated in at least one two-dimensional plane. Since the object in the point source method may be assumed to be an aggregate of a plurality of points that emit light, the hologram signal generating unit 110 may generate the hologram signal corresponding to each point on at least one two-dimensional plane without projecting light on the object.

The hologram signal generated by the hologram signal generating unit 110 on the two-dimensional plane may be represented by a sub hologram or a sub-fringe pattern, but is collectively referred to as a hologram signal in this specification.

The processor 130 controls the overall operation of the hologram generating apparatus 100. In particular, the processor 130 may calculate the sparsity corresponding to the two-dimensional plane based on the hologram signal generated by the hologram signal generating unit 110.

Here, the two-dimensional plane may be a virtual depth layer constituting the three-dimensional object or a virtual plane existing between the object and the CGH plane. For example, the two-dimensional plane may be a virtual plane which is implemented on a computer.

When the two-dimensional plane is a virtual depth layer constituting a three-dimensional object, the sparsity may be a ratio of the number of points included on the depth layer to the total number of points constituting the object.

Also, when the two-dimensional plane is a virtual plane existing between the object and the CGH plane, the sparsity may be the number of dominant hologram signals satisfying predetermined conditions in the hologram signal generated on the plane.

In addition, the processor 130 may calculate a fringe pattern of the object based on at least a portion of the hologram signal generated on the two-dimensional plane. A sparse fast Fourier transform (SFFT) may be used to calculate the fringe pattern. Therefore, the hologram signal may be converted into the fringe pattern of the object by SFFT. The SFFT is described as a sparse-based Fourier transform, which will be described in more detail in FIGS. 3 and 5.

In addition, the processor 130 may repeatedly calculate the fringe pattern until the number of dominant signals included in the calculated fringe pattern coincides with the threshold value determined based on the sparsity. Specifically, the threshold value is a value determined in proportion to the sparsity, and the processor 130 may repeatedly calculate the fringe pattern until the number of dominant signals included in the fringe pattern coincides with the threshold value. However, the present disclosure is not limited to this, and if the number of dominant signals is equal to or greater than the threshold value, the processor 130 may stop the fringe pattern calculation.

For example, if the sparsity is a ratio of the number of points included in the specific depth layer to the total number of points constituting the object, the processor 1300 may repeatedly calculate the fringe pattern until the number of dominant signals included in the fringe pattern coincides with a predetermined threshold determined in proportion to the ratio. If the sparsity is the number of dominant hologram signals satisfying predetermined conditions in the hologram signal generated on the two-dimensional plane, the processor 130 may repeatedly calculate the fringe pattern until a predetermined threshold value determined in proportion to the number of the signals matches the number of dominant signals included in the fringe pattern.

The pattern writing unit 120 may record the fringe pattern calculated by the processor 130 on a computer-generated holography (CGH) plane. Accordingly, the pattern writing unit 120 may generate the hologram by recording the final fringe pattern for the object calculated by the processor 130 on the CGH plane.

Here, the CGH plane may be realized by a photosensitive film, a spatial light modulator (SLM), or the like. Accordingly, the pattern writing unit 120 may generate a hologram for the object 200 by recording a fringe pattern on the photosensitive film or the SLM. However, the example is not limited thereto, and the CGH plane may refer to a virtual plane which is implemented on a computer to record a fringe pattern on a photosensitive film or a spatial light modulator and includes information on the fringe pattern.

Hereinafter, a specific example embodiment of the hologram signal generation and sparsity calculation method will be described.

Figure 2:
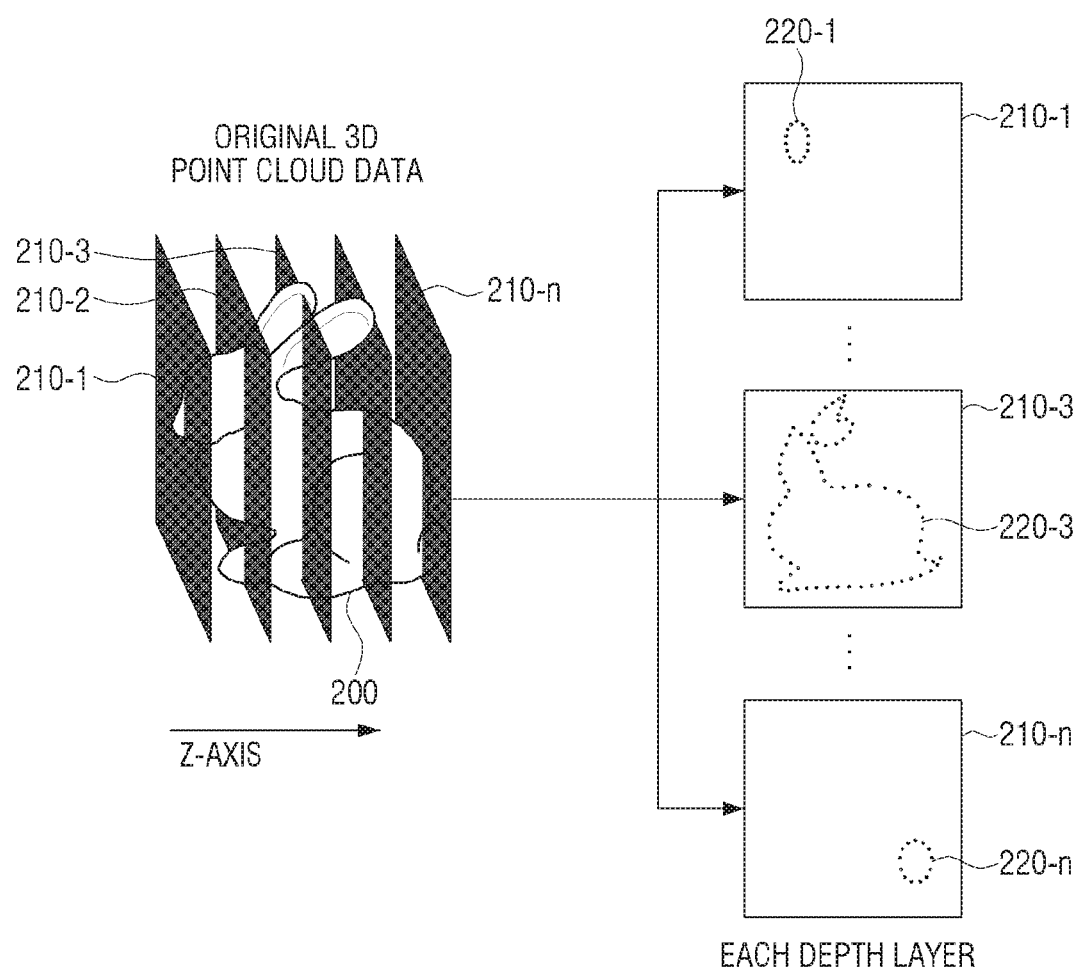
FIG. 2 is a diagram illustrating a depth layer-based hologram signal generating method according to an example embodiment of the present disclosure.

FIG. 2 is a diagram illustrating a depth layer-based hologram signal generating method according to an example embodiment of the present invention.

As illustrated in FIG. 2, the hologram signal generating unit 110 may divide an object 200 implemented as an aggregate of a plurality of points into a plurality of depth layers 210-1, 210-2, ..., 210-n.

The plurality of depth layers 210-1, 210-2, ..., and 210-n are virtual two-dimensional planes, and may be positioned parallel to the Z axis. In addition, the distance between the plurality of depth layers 210-1, 210-2, ..., 210-n may be determined based on the number of all points constituting the object 200. Accordingly, the number of the plurality of depth layers 210-1, 210-2, ..., and 210-n may be determined in proportion to the total number of points constituting the object 200, the size of the object, the number of preset depth layers, and the like.

If the object 200 is divided into a plurality of depth layers 210-1 to 210-n, hologram signals 220-1, 220-2, ..., 220-n corresponding to a plurality of points included in each of the plurality of depth layers 210-1, 210-2, ..., 210-n may be generated on a two-dimensional plane corresponding to each of the plurality of depth layers 210-1, 2, ..., 220-n.

For example, in the two-dimensional plane generated by dividing the object 200 into the first depth layer 210-1, a hologram signal corresponding to a plurality of points 220-1 included in the first depth layer 210-1 among all points constituting the object 200 may be generated.

Therefore, the hologram signal generating unit 110 generates a hologram signal corresponding to a plurality of points 220-1 to 220-n included in each of a plurality of depth layers 210-1, 210-2, ..., 210-n, instead of generating a hologram signal corresponding to all points constituting the object 200.

Here, the processor 130 may calculate a sparsity for each depth layer. The processor 130 may calculate the ratio of the number of points included in each depth layer to the total number of points constituting the object by sparsity. For example, if the total number of points constituting the object 200 is N and the number of the plurality of points 220-1 included in the first depth layer 210-1 is k, The sparsity for the first depth layer may be k/N.

Accordingly, the processor 130 may calculate a sparsity for each of the plurality of depth layers 210-1, 210-2, ..., 210-n.

Hereinafter, a method of calculating the fringe pattern based on the hologram signal for each depth layer and the calculated sparsity will be described.

Figure 3:
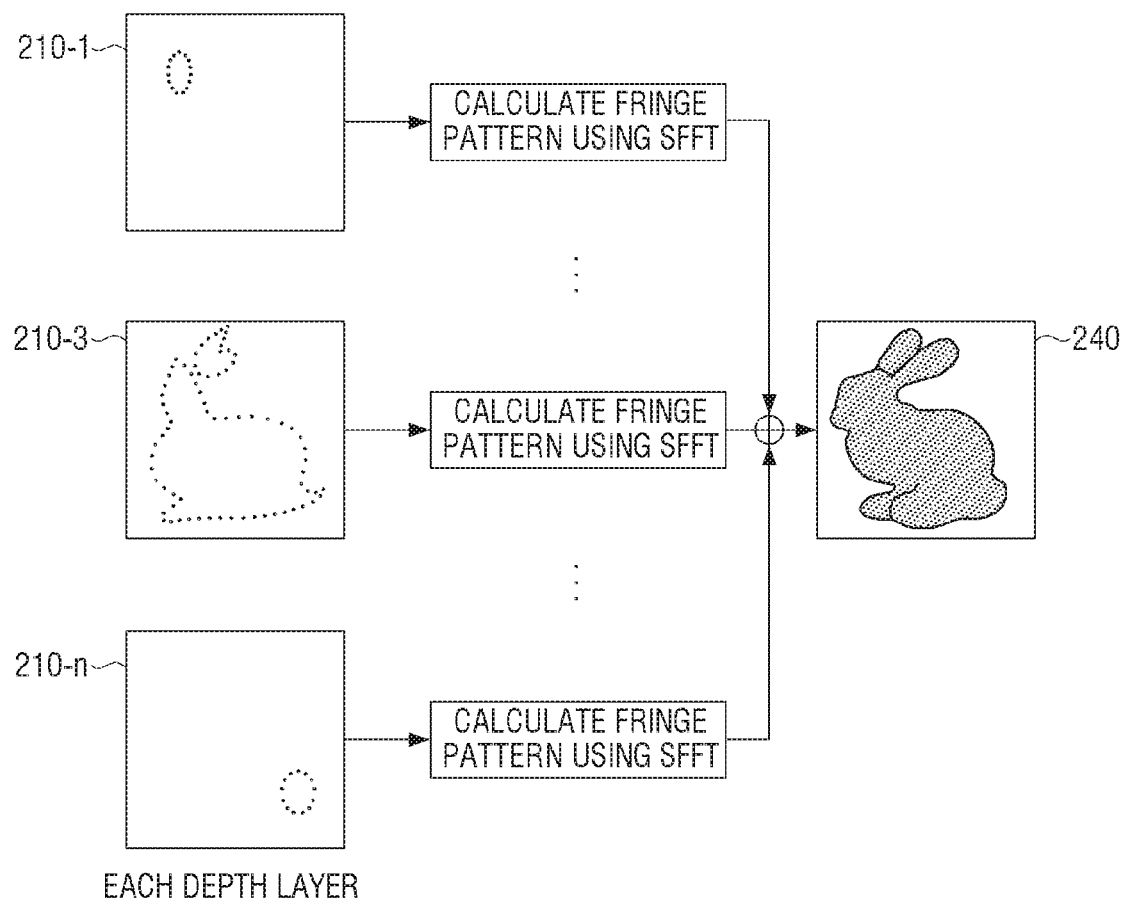
FIG. 3 is a diagram illustrating a method of calculating a fringe pattern based on the hologram signal illustrated in FIG. 2.

FIG. 3 is a diagram illustrating a method of calculating a fringe pattern based on the hologram signal shown in FIG. 2.

As illustrated in FIG. 3, the hologram signal generating unit 110 according to an example embodiment of the present disclosure may generate a hologram signal corresponding to each of a plurality of depth layers 210-1, 210-2, ..., 210-n. In addition, the processor 130 may calculate a sparsity for each of the plurality of depth layers 210-1, 210-2, ..., 210-n. For example, the hologram signal generating unit 110 may generate a first hologram signal corresponding to a plurality of points 220-1 included in the first depth layer 210-1 on a two-dimensional plane, and the processor 130 may calculate the ratio of the number (k) of points included in the first depth layer 210-1 to the total number (N) of the points constituting the object 200 to obtain a first sparsity with respect to the first depth layer 210-1.

In addition, the processor 130 may determine a preset threshold value based on the calculated sparsity. The predetermined threshold is a value proportional to the sparsity. For example, if the first sparsity calculated for the first depth layer 210-1 is a high value (for example, a value close to 1), the predetermined threshold value may be determined in proportion to the first sparsity.

In addition, the processor 130 may calculate a fringe pattern for each of the plurality of depth layers 210-1, 210-2, ..., 210-n based on the hologram signal. In calculating the fringe pattern, the processor 130 may calculate a fringe pattern by applying SFFT to at least a part of the hologram signal. SFFT can be expressed by the following equation 1.

[Mathematical formula 1]

$$u(\xi, \eta) = \sum_{k=1}^{n} \frac{\exp\left(j\frac{2\pi}{\lambda}z_k\right)}{j\lambda z_k} \int\int u_k(x, y)\exp\left(j\frac{\pi}{\lambda z_k}((\xi-x)^2 + (\eta-y)^2)\right)dxdy$$

$$\approx \sum_{k=1}^{n} \frac{\exp\left(j\frac{2\pi}{\lambda}z_k\right)}{j\lambda z_k} SF^{-1}[SF[u_k(\xi, \eta)] \cdot SF[h(\xi, \eta)]],$$

where $z_k$ is the distance between the kth depth layer and the CGH plane among the plurality of depth layers, $u_k(x,y)$ is the signal value of the kth depth layer (x, y) coordinate among the plurality of depth layers, SF is the sparse Fourier transform, $SF^{-1}$ is the sparse Fourier inverse formula, $\xi$ and $\eta$ are the CH surface coordinate values, and $h(\xi,\eta)$ is the impulse response function.

The impulse response function can be expressed by the following equation 2.

$$h(\xi, \eta) = \exp\left(j\frac{\pi}{\lambda z}(\xi^2 + \eta^2)\right),$$ [Mathematical formula 2]

where λ is the wavelength of the light reflected by the object by the hologram signal generating unit 110.

The processor 130 may arbitrarily acquire a part of the hologram signal and apply SFFT. Here, the number of signals arbitrarily acquired from the hologram signal by the processor 130 may be determined based on the sparsity. If a part of signals are arbitrarily acquired from a hologram signal corresponding to a depth layer having a high sparsity value (e.g., a value close to 1), the processor 130 may acquire a larger number of signals than the other depth layers and apply SFFT.

For example, when the processor 130 acquires a part of signals on a two-dimensional plane on which a hologram signal corresponding to a plurality of points 220-1 included in the first depth layer 210-1 is generated, the processor 130 may determine the number of signals to be acquired from the hologram signal based on the sparsity for the first depth layer.

In addition, the processor 130 may determine the number of dominant signals for the fringe pattern generated by applying the SFFT to a part of the acquired hologram signal. In addition, the processor 130 may repeatedly calculate the fringe pattern until the number of dominant signals coincides with the threshold value determined based on the sparsity. The dominant signal means a signal selected based on the magnitude among the calculated fringe patterns. Specifically, the processor 130 may select a signal having a magnitude greater than a predetermined value from among the calculated fringe patterns as a dominant signal. The processor 130 may repeatedly calculate the fringe pattern until the selected dominant signal is accumulated and coincides with a preset threshold value. However, the present disclosure is not limited thereto, and the fringe pattern may be repeatedly calculated until the dominant signal included in the calculated fringe pattern coincides with a preset threshold value.

The pattern generating unit 120 may record the fringe pattern calculated by the processor 130 on a CGH plane. The hologram of the CGH plane 240 is generated by illuminating the CGH plane 240 on which the fringe pattern is recorded with light having the same wavelength as the light emitted by the hologram signal generating unit 110 to the object 200.

Hereinafter, a hologram generating method using a virtual plane will be described.

Figure 4:
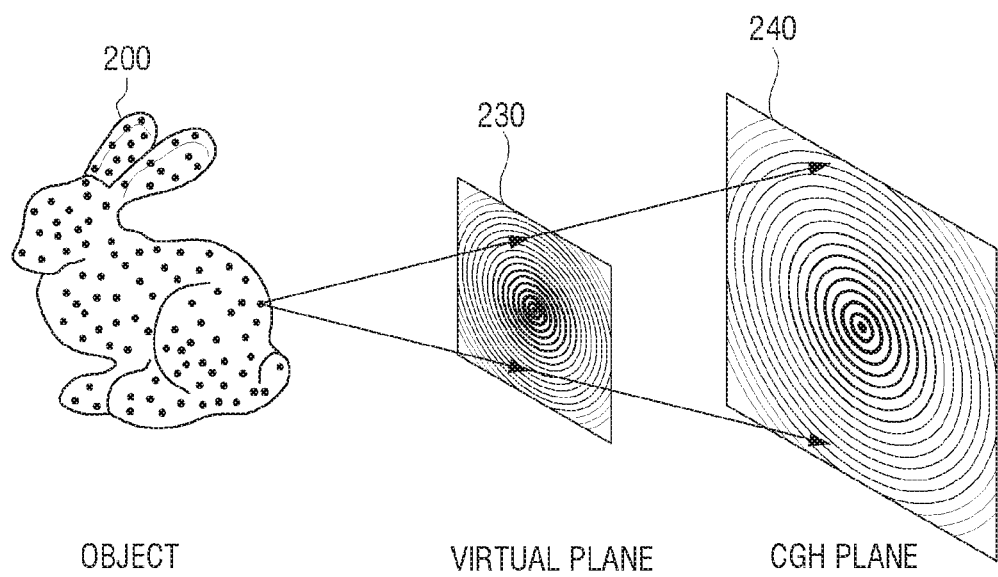
FIG. 4 is a diagram illustrating a virtual plane-based hologram signal generating method according to an example embodiment of the present disclosure.

FIG. 4 is a diagram illustrating a virtual plane-based hologram signal generating method according to an example embodiment of the present disclosure.

As illustrated in FIG. 4, when the object 200 is assumed to be an aggregate of a plurality of points, the hologram signal generating unit 110 may generate a hologram signal corresponding to each point.

The hologram signal generating unit 110 may generate a hologram signal corresponding to each of all the points existing in the object 200 in the two-dimensional virtual plane 230 existing between the object 200 and the CGH plane 240.

Although FIG. 4 illustrates a hologram signal for one point, the hologram signal generating unit 110 may generate a hologram signal for a point existing in the object 200 in the virtual plane 230. In addition, there is one virtual plane 230 existing between the object 200 and the CGH plane 240, and the hologram signal generating unit 110 may generate a hologram signal for a plurality of points existing in the object 200 in one virtual plane 230.

In addition, the virtual plane 230 may be implemented at a lower resolution than the resolution of the CGH plane 240. Therefore, the number of operations performed by the processor 130 to produce the fringe pattern can be reduced when the hologram signal for the object 200 is generated in the virtual plane 230 rather than when generated on the CGH plane 240. For example, if the size of the object 200 is 200×200, the resolution of the virtual plane 230 is 640×360, and the resolution of the CGH plane 240 is FHD (1920× 1080), a total of 82,944,000,000 arithmetic operations must be performed. In the case of the virtual plane 230, a total of 9,216,000,000 arithmetic operations can be performed to calculate the fringe pattern. Therefore, the total number of operations is reduced to ⅑. However, the example is not limited to the above-mentioned resolutions, and the virtual plane 230 may have various resolutions, which are implemented with a smaller number of pixels than the number of pixels constituting the CGH plane 240.

Hereinafter, a method of calculating a fringe pattern for recording on the CGH plane 240 from the hologram signal generated in the virtual plane 230 will be described.

Figure 5:
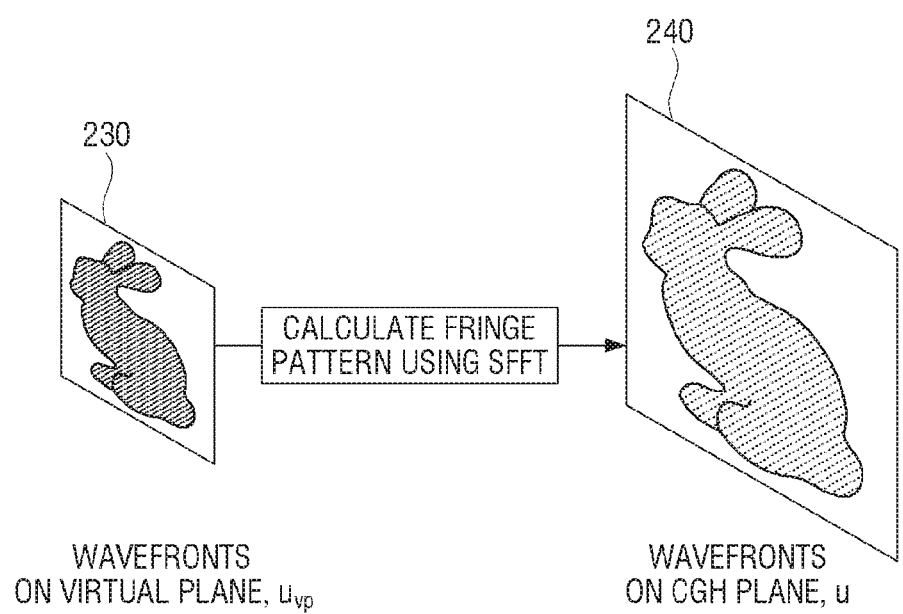
FIG. 5 is a diagram illustrating a method of calculating a fringe pattern based on the hologram signal illustrated in FIG. 4.

FIG. 5 is a diagram illustrating a method of calculating a fringe pattern based on the hologram signal illustrated in FIG. 4.

As illustrated in FIG. 5, according to an example embodiment of the present disclosure, the hologram signal generating unit 110 may generate a hologram signal corresponding to all the points constituting the object 200 on the virtual plane 230.

In addition, the processor 130 may calculate a sparsity corresponding to the two-dimensional virtual plane 230. The sparsity calculated by the processor 130 is the number of dominant hologram signals satisfying predetermined conditions in the hologram signal generated in the virtual plane 230. Here, the predetermined condition may be whether or not a threshold value regarding the size of the signal in the hologram signal generated in the virtual plane 230 is satisfied. Accordingly, the processor 130 may calculate the number of dominant hologram signals having a magnitude greater than the threshold value of the hologram signal generated in the virtual plane 230 by sparsity.

In addition, the processor 130 may acquire a part of the hologram signals generated in the virtual plane 230 and apply SFFT. Here, the number of signals acquired from the hologram signal by the processor 130 may be determined based on the sparsity. Specifically, the number of sparsity calculated by the processor 130 and the number of acquired signals may be proportional.

The processor 130 may randomly sample some of the hologram signals.

The processor 130 according to another example embodiment of the present disclosure may acquire the number of hologram signals as much as the number of signals determined based on the sparsity in descending order.

In addition, the processor 130 may calculate a fringe pattern by applying SFFT to the acquired signal. SFFT can be expressed by the following equation 3.

[Mathematical formula 3]

$$u(\xi, \eta) = \frac{\exp\left(j\frac{2\pi}{\lambda}z_2\right)}{j\lambda z_2} \int \int u_{VP}(x, y)\exp\left(j\frac{\pi}{\lambda z_2}((\xi-x)^2 + (\eta-y)^2)\right)dxdy \approx$$

$$\frac{\exp\left(j\frac{2\pi}{\lambda}z_2\right)}{j\lambda z_2} SF^{-1}[SF[u_{VP}(\xi, \eta)] \cdot SF[h(\xi, \eta)]],$$

where $z_2$ is the distance between the virtual two-dimensional plane and the CGH plane, $u_{VP}(x,y)$ is the signal value of the virtual two-dimensional plane (x, y) coordinate, SF is the sparse Fourier transform formula, $SF^{-1}$ is the sparse Fourier inverse formula, $\xi$ and $\eta$ are CGH plane coordinate values, and $h(\xi,\eta)$ is an impulse response function.

The impulse response function can be expressed by the following equation 2.

$$h(\xi, \eta) = \exp\left(j\frac{\pi}{\lambda z}(\xi^2 + \eta^2)\right),$$

where $\lambda$ is the wavelength of the light reflected by the object by the hologram signal generating unit 110.

In addition, the processor 130 may determine the number of dominant signals for the fringe pattern generated by applying the SFFT to a part of the acquired hologram signal. In addition, the processor 130 may repeatedly calculate the fringe pattern until the number of dominant signals coincides with the threshold value determined based on the sparsity. The dominant signal means a signal selected based on the magnitude among the calculated fringe patterns. Specifically, the processor 130 may select a signal having a magnitude greater than a predetermined value from among the calculated fringe patterns as a dominant signal. The processor 130 may repeatedly calculate the fringe pattern until the selected dominant signal is accumulated and coincides with a preset threshold value. However, the present disclosure is not limited thereto, and the fringe pattern may be repeatedly calculated until the dominant signal included in the calculated fringe pattern coincides with a preset threshold value.

The pattern writing unit 120 may record the fringe pattern calculated by the processor 130 on a CGH plane 240. Accordingly, the pattern writing unit 120 may generate the hologram by recording the final fringe pattern for the object 200 calculated by the processor 130 on the CGH plane 240. As illustrated in FIG. 5, the hologram for the object 200 displayed on the CGH plane 240 is generated by illuminating, by the hologram signal generating unit 110, the CGH plane 240 on which the fringe pattern is recorded with light having the same wavelength as the light emitted by the hologram signal generating unit 110 to the object 200.

Hereinafter, a method of generating the hologram signal in parallel by dividing the object 200 into a plurality of clusters will be described.

Figure 6:
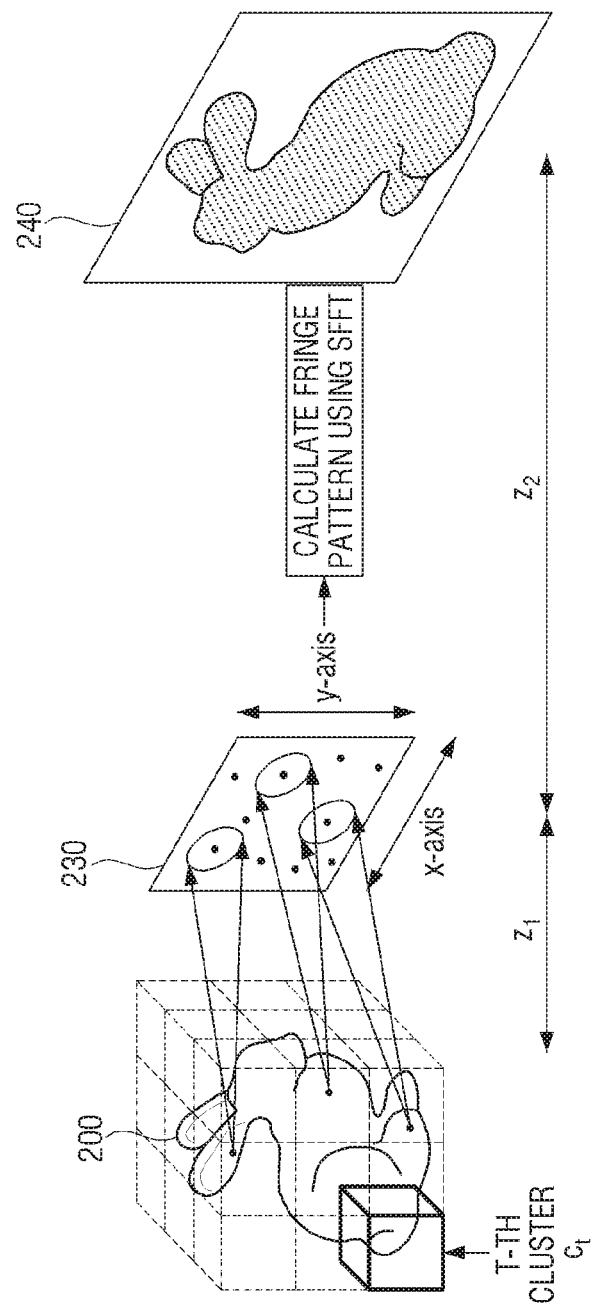
FIG. 6 is a diagram illustrating a method for calculating a fringe pattern by dividing an object according to an example embodiment of the present disclosure into a plurality of clusters.

FIG. 6 is a diagram illustrating a method for calculating a fringe pattern by dividing an object according to an example embodiment of the present disclosure into a plurality of clusters.

As illustrated in FIG. 6, the hologram signal generating unit 110 may divide all the points constituting the object 200 into a plurality of clusters.

The hologram signal generating unit 110 according to an example embodiment of the present disclosure may include a multithread capable of processing a plurality of calculations at the same time. In this case, the hologram signal generating unit 110 may allocate the plurality of clusters to each of the multithreads. Therefore, the hologram signal generating unit 110 may generate a hologram for each of the plurality of clusters in parallel on a corresponding area on the two-dimensional plane 230.

Specifically, the thread to which the t-th cluster is allocated may generate a hologram signal corresponding to the point included in the t-th cluster in the virtual plane 230, and simultaneously, the other thread to which the (t+1)th cluster is allocated may also generate a hologram signal corresponding to the point included in the (t+1)th cluster in the virtual plane 230. Although FIG. 6 illustrates an example embodiment in which hologram signals are generated in parallel on a virtual plane, the example is not limited thereto.

Therefore, in the depth-layer-based hologram generation according to another embodiment of the present disclosure, the hologram signal generating unit 110 may generate a hologram signal for each of a plurality of depth layers 210-1, 210-2, . . . , 210-n in parallel by allocating the plurality of depth layers 210-1, 210-2, . . . , 210-n to each of the multithreads.

Specifically, the thread to which the t-th depth layer is allocated may generate the hologram signal corresponding to the plurality of points included in the t-th depth layer, and simultaneously, the other thread to which the (t+1)th depth layer is allocated may also generate a hologram signal corresponding to a plurality of points included in the (t+1) depth layer.

Hereinafter, a specific example embodiment in which the hologram signal generating unit 110 generates a hologram signal will be described.

Figure 7:
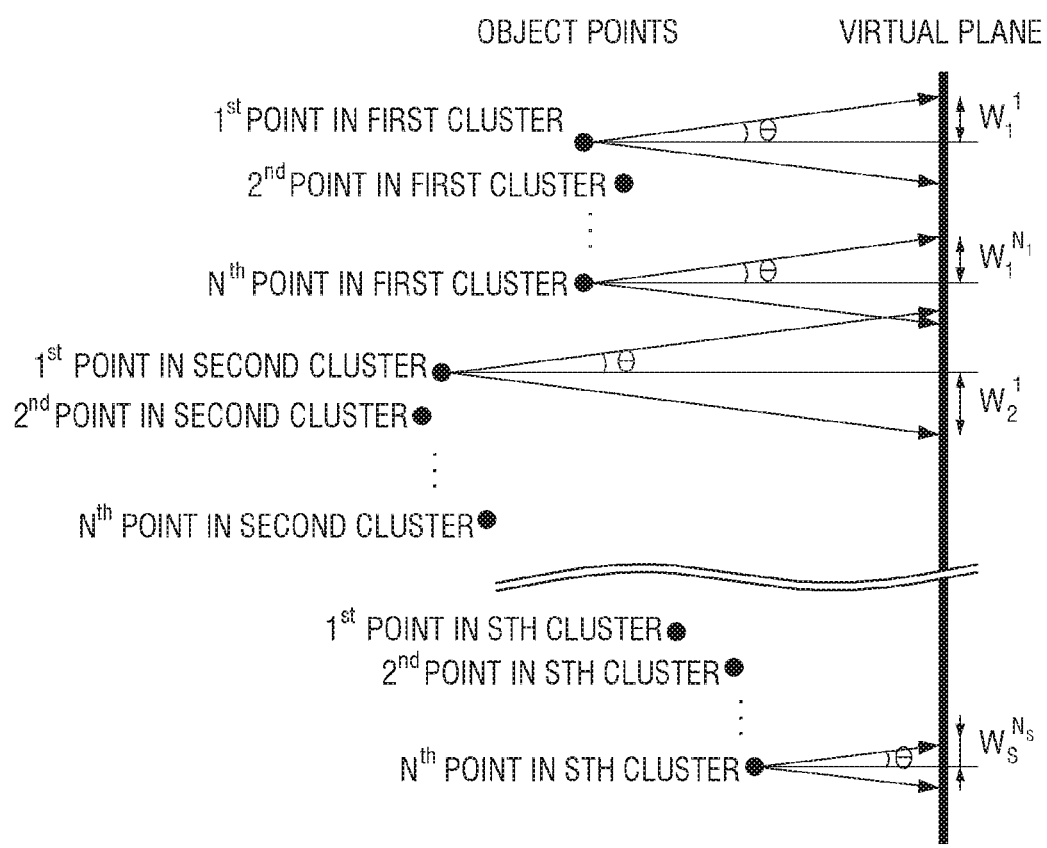
FIG. 7 is a diagram illustrating a method for generating a hologram signal on a virtual plane according to an example embodiment.

FIG. 7 is a diagram illustrating a method for generating a hologram signal on a virtual plane 230 according to an example embodiment.

As illustrated in FIG. 7, the hologram signal generating unit 110 may generate a hologram signal corresponding to all the points constituting the object 200 on the virtual plane 230. On the other hand, each pixel constituting the virtual plane 230 may be specified by (x, y) coordinates as illustrated in FIG. 6.

Here, the hologram signal generating unit 110 may generate the hologram signal for the (x, y) coordinates of the virtual plane 230 using Equation 4.

$$u_{vp}(x, y) = \sum_{i=1}^{N} \frac{A_i}{R_i}\exp(jkR_i), \quad \text{[Mathematical formula 4]}$$

where $R_i$ is a distance between the object and a virtual two-dimensional plane, which is calculated as $R_i = \sqrt{(x-x_i)^2+(y-y_i)^2+(z_i)^2}$, x and y are coordinate values of a virtual two-dimensional plane, $x_i$, $y_i$ and $z_i$ are coordinate values for the i-th point existing in the object 200, k is the frequency of the reference light, $A_t^i$ is the intensity of the light at the i-th point present in the object.

In addition, as illustrated in FIG. 7, 7, when the hologram signal generating unit 110 according to an example embodiment of the present disclosure divides all the points constituting the object into a plurality of clusters, and generates the hologram signal for each of the plurality of clusters in a corresponding area on the virtual plane, the hologram signal may be generated using Equation (5) below.

$$u_{vp}(x, y) = \sum_{t=1}^{S}\sum_{i=1}^{N_t} \frac{A_t^i}{R_t^i}\exp(jkR_t^i), \quad \text{[Mathematical formula 5]}$$

where $R_t^i$ is the distance between the object and the virtual two-dimensional plane, which is calculated as $R_t^i = \sqrt{(x-x_t^i)^2+(y-y_t^i)^2+(z_t^i)^2}$, x and y are the coordinate values of the virtual two-dimensional plane, $x_t^i$, $y_t^i$ and $z_t^i$ are coordinate values for the i-th point in the t-th cluster, k is the frequency of the reference light, and $A_t^i$ is the intensity of light at the i-th point in the t-th cluster.

Hereinafter, a specific example embodiment of a method of acquiring the generated hologram signal in the virtual plane 230 will be described.

Figure 8:
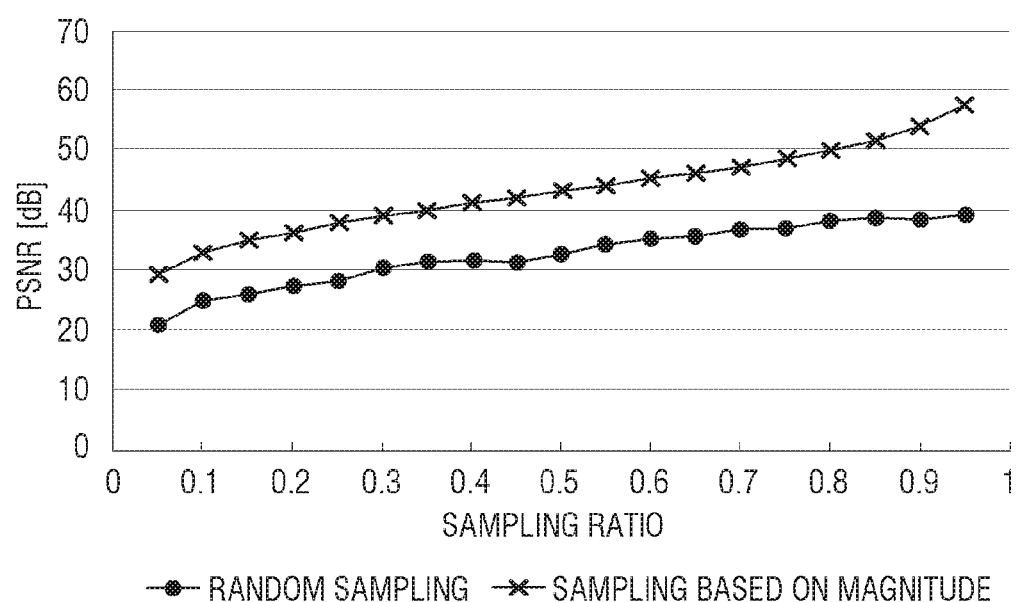
FIG. 8 is a graph for explaining a PSNR value change according to a method of acquiring a part of a hologram signal according to an example embodiment of the present disclosure.

FIG. 8 is a graph for explaining a PSNR value change according to a method of acquiring a part of a hologram signal according to an example embodiment of the present disclosure.

As illustrated in FIGS. 4-7, the hologram signal generating unit 110 may generate a plurality of hologram signals having a plurality of points present on the surface of the object 200 as a source in the virtual plane 200.

The processor 130 according to an example embodiment of the present disclosure may randomly sample some of the hologram signals generated on the virtual plane 200. The processor 130 may calculate a fringe pattern by applying SFFT to the acquired signal.

The processor 130 according to another example embodiment of the present disclosure may acquire some of the signals satisfying a predetermined condition among the hologram signals generated on the virtual plane 200. Here, the signal satisfying the predetermined condition may be a hologram signal having a magnitude greater than a threshold value of the magnitude of the hologram signal. Thus, the processor 130 may sample some of the signals based on the magnitude of the signal in the hologram signal generated in the virtual plane 200. The processor 130 may calculate a fringe pattern by applying SFFT to the some of the sampled signals based on the magnitude.

FIG. 8 illustrates a difference in PSNR [dB] value according to the above-described sampling method. Here, the Peak Signal-to-Noise Ratio (PSNR) value is a value indicating the difference (or loss rate) between the holograms generated by the object 200 and the hologram generating apparatus 100. The higher the PSNR value, the smaller the difference between the object 200 and the hologram. Generally, if the PSNR has a value of 30 dB or more, it is difficult to visually confirm the difference between the object 200 and the hologram. PSNR can be expressed by the following equation 6.

$$PSNR = 10\log_{10}\left(\frac{MAX_I^2}{MSE}\right)$$ [Mathematical formula 6]

Here, the PSNR is measured in log units, and the MSE is a mean square error at the same coordinates between the object 200 and the hologram, which may be calculated using Equation 7 below.

$$MSE = \frac{1}{mn}\sum_{i=0}^{m-1}\sum_{j=0}^{n-1}\|I(i,j) - K(i,j)\|^2$$ [Mathematical formula 7]

Here, m is the x-axis resolution, n is the y-axis resolution, I (i, j) is the pixel value of the hologram at the coordinates (i, j), and K(i, j) is the pixel value of the object 200 at the coordinates (i, j).

FIG. 8 illustrates a PSNR value when the processor 130 according to an example embodiment of the present disclosure acquires some signals based on the size of the hologram signal and calculates a fringe pattern. In this case, even when the sampling ratio of the acquired hologram signal has a small value (0.1 or less), the PSNR value is about 30 [dB] and the difference (or loss rate) between the object 200 and the hologram is not large.

FIG. 8 illustrates a PSNR value when the processor 130 randomly samples some of the hologram signals and calculates a fringe pattern according to another example embodiment of the present disclosure. In this case, FIG. 8 illustrates that the PSNR value reaches 30 [dB] when the sampling ratio of the acquired hologram signal is equal to or greater than 0.3.

When the processor 130 according to an example embodiment of the present disclosure randomly samples some of the hologram signals generated in the virtual plane 200 and calculates a fringe pattern, the processor 130 repeatedly calculates a fringe pattern until the threshold value determined based on sparsity coincides with the number of dominant signals included in the calculated fringe pattern. Therefore, the PSNR value may have a value of 30 [dB] or more even when some signals are randomly sampled.

Figure 9:
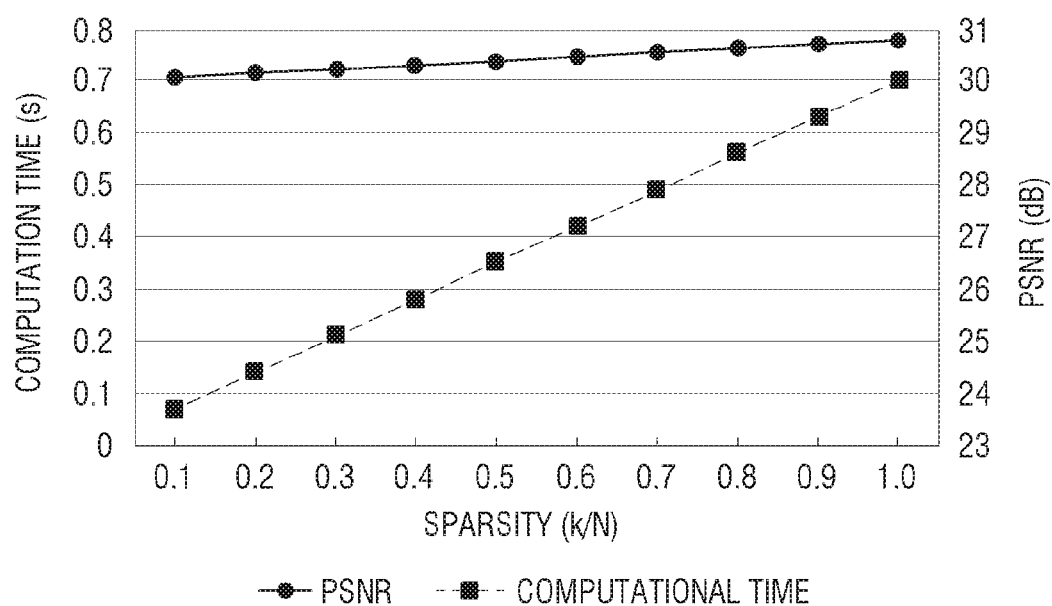
FIG. 9 is a graph for explaining a change in the PSNR value in sparsity change according to an example embodiment of the present disclosure.

FIG. 9 is a graph for explaining a change in the PSNR value in sparsity change according to an example embodiment of the present disclosure.

The processor 130 according to an example embodiment of the present disclosure may repeatedly calculate the fringe pattern until the number of dominant signals included in the calculated fringe pattern coincides with the threshold value determined based on the sparsity. Here, the threshold value is a value determined in proportion to the sparsity. However, the present disclosure is not limited thereto, and the processor 130 may determine the sparsity itself as a threshold value, and repeatedly calculate the fringe pattern until the number of dominant signals included in the fringe pattern coincides with the sparsity.

In the method of generating a hologram signal based on a virtual plane 200 according to an example embodiment of the present disclosure, the sparsity calculated by the processor 130 is the number of dominant hologram signals satisfying predetermined conditions in the hologram signal generated in the virtual plane 230. Here, the predetermined condition may be whether or not a threshold value regarding the size of the signal in the hologram signal generated in the virtual plane 230 is satisfied. Accordingly, the processor 130 may calculate the number of dominant hologram signals having a magnitude greater than the threshold value of the hologram signal generated in the virtual plane 230 by sparsity.

Therefore, the number of dominant hologram signals satisfying predetermined conditions according to the change of the threshold value with respect to the signal size may be changed. Specifically, when the threshold value is lowered, the number of dominant hologram signals satisfying the condition regarding the signal size is increased. Since the processor 130 samples the dominant hologram signal and calculates the fringe pattern, the computation amount of the processor 130 also increases proportionally.

According to another example embodiment of the present disclosure, when the threshold value is increased, the number of dominant hologram signals satisfying the condition regarding the signal size is reduced. The computation amount of the processor 130 which calculates the fringe pattern by sampling dominant hologram signals also decreases proportionally.

Specifically, as illustrated in FIG. 9, as the ratio of the sparsity approaches 0.1, the computation time of the processor 130 for calculating the fringe pattern decreases and as the ratio of the sparsity approaches 1, the computation time of the processor 130 for calculating the fringe pattern is increased. Therefore, the computation time of the processor 130 and the sparsity are proportional.

However, as illustrated in FIG. 9, the amount of change of the PSNR according to the change amount of the sparsity is small. Specifically, when the ratio of the sparsity approaches 0.1, the PSNR is maintained at 30 [dB] or higher, and the PSNR does not exceed 31 [dB] even when the ratio of the sparsity approaches 1. Generally, when PSNR is 30 [dB] or more, the difference (or loss rate) between the object 200 and the hologram cannot be visually recognized. Therefore, it is preferable that the sparsity has a value of 0.1 to 0.5, considering the variation of the computation time of the processor 130 and the change of the PSNR according to the change of the sparsity. However, the example is not limited thereto, and sparsity may be determined in a variety of ways to account for the size of the object, the number of points on the surface of the object, and the sharpness of the hologram.

Hereinafter, a hologram generated according to an example embodiment of the present disclosure and an object 200 will be specifically compared and described.

Figure 10:
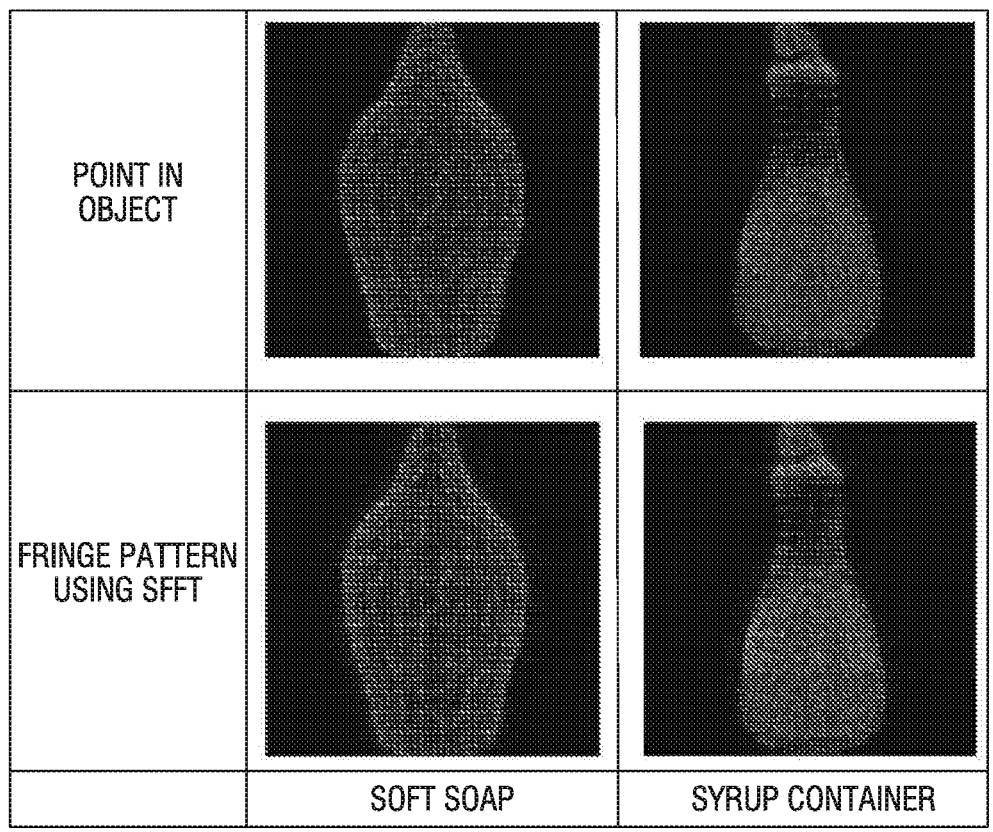
FIG. 10 is a diagram comparing an object and a hologram generated by a fringe pattern according to an example embodiment of the present disclosure.

FIG. 10 is a diagram comparing an object and a hologram generated by a fringe pattern according to an example embodiment of the present disclosure.

As illustrated in FIG. 10, the object 200 may be represented by a plurality of aggregates of points.

The processor 130 according to an example embodiment of the present disclosure may calculate a fringe pattern based on a part of the hologram signal generated by the hologram signal generating unit 110. Specifically, the processor 130 may repeatedly calculate the fringe pattern until the number of dominant signals of the calculated fringe pattern coincides with the predetermined threshold value determined based on the sparsity. The fringe pattern calculated by the processor 130 is recorded in the CGH plane by the pattern writing unit 120.

When the hologram signal generating unit 110 reflects the light having the same wavelength as that of the light irradiated on the object 200 to the CGH plane on which the fringe pattern is recorded, a hologram for the object 200 is generated.

As illustrated in FIG. 10, the hologram generated by the hologram generating apparatus 100 based on the sparsity according to an example embodiment of the present disclosure has a PSNR of 30 [dB] or more, and there is no difference visually between the object 200 and the hologram.

Figure 11:
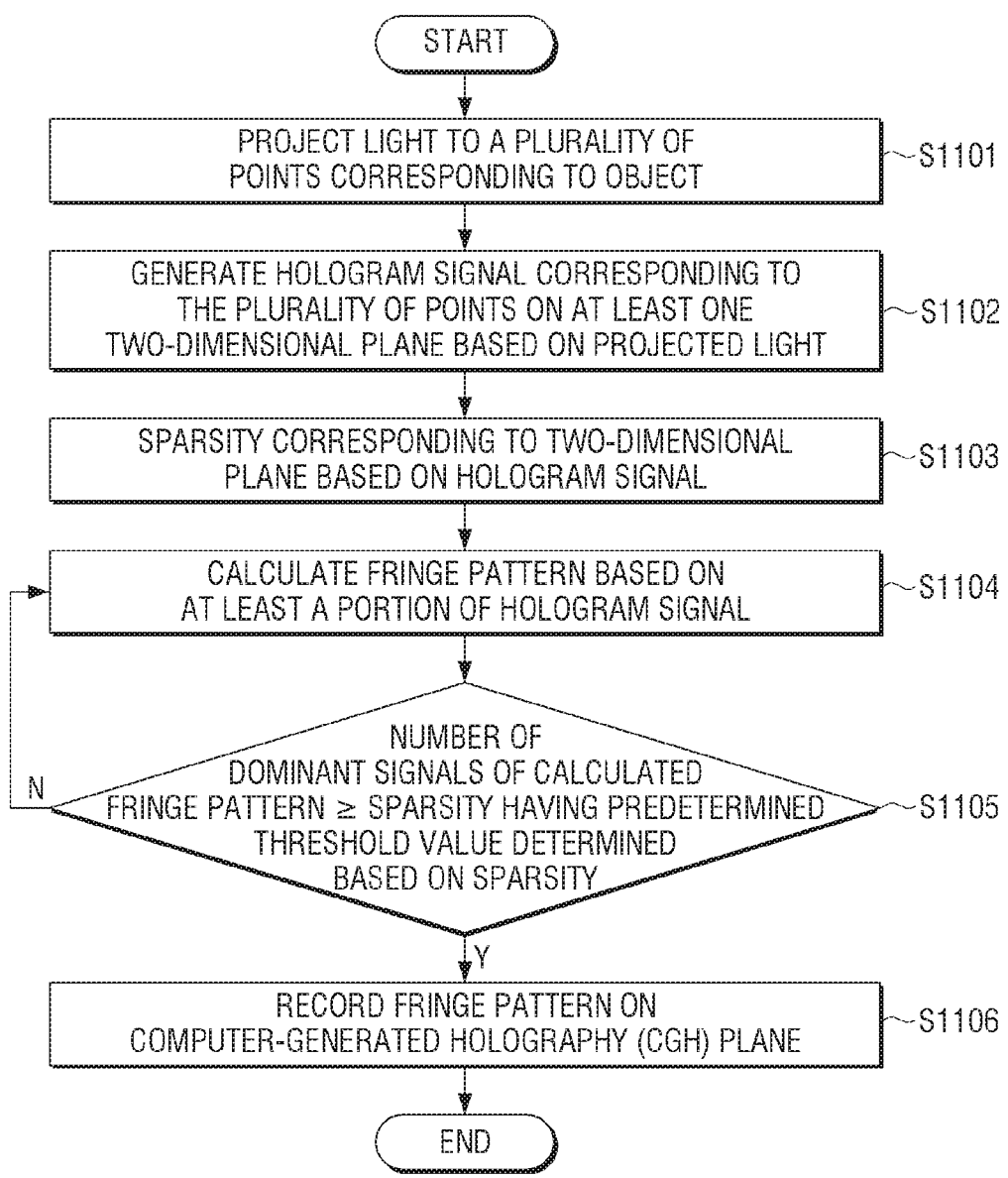
FIG. 11 is a flowchart illustrating a method for calculating a fringe pattern according to an example embodiment of the present disclosure.

FIG. 11 is a flowchart illustrating a method for calculating a fringe pattern according to an example embodiment of the present disclosure.

As illustrated in FIG. 11, the hologram generating method projects light to at least some points corresponding to the object, at step S1101.

A method of generating a hologram signal generates a hologram signal corresponding to at least some points on at least one two-dimensional plane based on the projected light, at step S1102.

Further, a sparsity corresponding to the two-dimensional plane is calculated based on the hologram signal, at step S1103, and a fringe pattern is calculated based on at least a part of the hologram signal, at step S1104.

Here, when the number of the dominant signals of the calculated fringe pattern does not coincide with the predetermined threshold value determined based on the sparsity, S1105: N, the fringe pattern calculation may be repeated until the number of dominant signals coincides with the sparsity.

In the hologram generating method, the calculated fringe pattern is recorded on a computer-generated holography (CGH) plane, at step S1106.

Meanwhile, the method of generating hologram signal may include dividing an object into a plurality of depth layers, and generating a hologram signal corresponding to a plurality of points included in each of the plurality of depth layers on a two-dimensional plane corresponding to each of the plurality of depth layers. Here, the sparsity may be a ratio of the number of points included in each depth layer to the number of all the points included in the object.

Further, the distance between the plurality of depth layers may be determined based on the number of all points constituting the object.

Meanwhile, a method for calculating a fringe pattern may include generating a fringe pattern by applying the Equation 1 below, to at least some of the hologram signals.

$$u(\xi, \eta) = \sum_{k=1}^{n} \frac{\exp\left(j\frac{2\pi}{\lambda}z_k\right)}{j\lambda z_k} \int \int u_k(x, y)\exp\left(j\frac{\pi}{\lambda z_k}((\xi-x)^2 + (\eta-y)^2)\right)dxdy \approx \sum_{k=1}^{n} \frac{\exp\left(j\frac{2\pi}{\lambda}z_k\right)}{j\lambda z_k} SF^{-1}[SF[u_k(\xi, \eta)] \cdot SF[h(\xi, \eta)]],$$

where $z_k$ is the distance between the kth depth layer and the CGH plane among the plurality of depth layers, $u_k(x,y)$ is the signal value of the kth depth layer (x, y) coordinate among the plurality of depth layers, SF is the sparse Fourier transform formula, $SF^{-1}$ is the sparse Fourier inverse formula, $\xi$ and $\eta$ are the CGH plane coordinate values, and $h(\xi,\eta)$ is the impulse response function.

Meanwhile, the method for generating a hologram signal according to another example embodiment of the present disclosure may include generating a hologram signal corresponding to all the points constituting the object on a virtual two-dimensional plane present between the object and the CGH plane. Here, the sparsity may be the number of dominant hologram signals satisfying predetermined conditions among the hologram signals generated on the virtual two-dimensional plane.

Further, the resolution of the virtual two-dimensional plane may be realized at a lower resolution than the resolution of the CGH plane.

In addition, a method of generating a hologram signal includes dividing all the points constituting an object into a plurality of clusters, and generating hologram signals for each of the plurality of clusters in parallel on a corresponding area on a two-dimensional plane.

Here, the hologram signal can be generated based on the following equation 5.

$$u_{vp}(x, y) = \sum_{t=1}^{S} \sum_{i=1}^{N_t} \frac{A_t^i}{R_t^i}\exp(jkR_t^i),$$

where $R_t^i$ is the distance between the object and the virtual two-dimensional plane, which is calculated as $R_t^i = \sqrt{(x-x_t^i)^2+(y-y_t^i)^2+(z_t^i)^2}$, x and y are the coordinate values of the virtual two-dimensional plane, $x_t^i$, $y_t^i$ and $z_t^i$ are coordinate values for the i-th point in the t-th cluster, k is the frequency of the reference light, and $A_t^i$ is the intensity of the light at the i-th point in the t-th cluster.

The method of calculating the fringe pattern can be calculated by applying the following equation 3 to at least a part of the hologram signal.

$$u(\xi, \eta) = \frac{\exp\left(j\frac{2\pi}{\lambda}z_2\right)}{j\lambda z_2} \int \int u_{VP}(x, y)\exp\left(j\frac{\pi}{\lambda z_2}((\xi - x)^2 + (\eta - y)^2)\right)dxdy \approx$$

$$\frac{\exp\left(j\frac{2\pi}{\lambda}z_2\right)}{j\lambda z_2} SF^{-1}[SF[u_{VP}(\xi, \eta)] \cdot SF[h(\xi, \eta)]],$$

where $z_2$ is the distance between the virtual two-dimensional plane and the CGH plane, $u_{VP}(x,y)$ is the signal value of the virtual two-dimensional plane (x, y) coordinate, SF is the sparse Fourier transform formula, $SF^{-1}$ is the sparse Fourier inverse formula, $\xi$ and $\eta$ are CGH plane coordinate values, and $h(\xi,\eta)$ is an impulse response function.

On the other hand, in the method of recording on the CGH plane, only a fringe pattern having an amplitude of a predetermined threshold or more among the calculated fringe patterns can be recorded on the CGH plane.

Meanwhile, the methods according to various example embodiments of the present disclosure described above can be implemented by only software/hardware upgrade for existing hologram generating apparatus.

Further, a non-transitory computer readable medium recording therein program to sequentially perform a control method according to exemplary embodiments may be provided.

The non-transitory computer readable medium refers to a medium that stores data semi-permanently rather than storing data for a very short time, such as a register, a cache, a memory or etc., and is readable by an apparatus. These various applications or programs may be provided in a non-transitory computer readable medium such as a CD, DVD, hard disk, blue ray disk and memory card and ROM etc.

For example, at least one of these components, elements, modules or units may use a direct circuit structure, such as a memory, a processor, a logic circuit, a look-up table, etc. that may execute the respective functions through controls of one or more microprocessors or other control apparatuses.

What is claimed is:

1. A method of generating a digital hologram of an object using a point cloud method, the method comprising:
   projecting light to a plurality of points corresponding to the object;
   generating a hologram signal corresponding to the plurality of points, the hologram signal being generated on at least one two-dimensional plane, the generating being based on the projected light;
   calculating a sparsity corresponding to one of the at least one two-dimensional plane based on the hologram signal;
   calculating a fringe pattern based on at least a portion of the hologram signal; and
   recording the fringe pattern on a computer-generated holography (CGH) plane,
   wherein the calculating the fringe pattern comprises repeatedly calculating the fringe pattern until a number of dominant signals of the calculated fringe pattern is greater than or equal to a predetermined threshold value determined based on the sparsity.

2. The method as claimed in claim 1, wherein the generating the hologram signal comprises:
   dividing the object into a plurality of depth layers; and
   generating the hologram signal corresponding to a plurality of points, multiple sets of the plurality of points being included in the plurality of depth layers, the hologram signal being generated on the at least one two-dimensional plane corresponding to each of the plurality of depth layers,
   wherein the sparsity is a ratio of a number of points included in one of the plurality of depth layers to a total number of points included in the object.

3. The method as claimed in claim 2,
   wherein a first depth layer is provided at a predetermined distance from an adjacent second depth layer, and
   wherein the predetermined distance between the first depth layer and the second depth layer is determined based on a total number of points included in the object.

4. The method as claimed in claim 2, wherein the calculating the fringe pattern comprises generating the fringe pattern by applying the following equation to at least a part of the hologram signal:

$$u(\xi, \eta) =$$

$$\sum_{k=1}^{n} \frac{\exp\left(j\frac{2\pi}{\lambda}z_k\right)}{j\lambda z_k} \int \int u_k(x, y)\exp\left(j\frac{\pi}{\lambda z_k}((\xi - x)^2 + (\eta - y)^2)\right)dxdy \approx$$

$$\sum_{k=1}^{n} \frac{\exp\left(j\frac{2\pi}{\lambda}z_k\right)}{j\lambda z_k} SF^{-1}[SF[u_k(\xi, \eta)] \cdot SF[h(\xi, \eta)]],$$

where $Z_k$ is a distance between a k-th depth layer among the plurality of depth layers and a CGH plane, $u_k(x, y)$ is a signal value of a coordinate of the k-th depth layer among the plurality of depth layers, SF is a sparse Fourier transform formula, $SF^{-1}$ is a sparse Fourier inverse transform formula, $\xi$ and $\eta$ are CGH plane coordinate values, and $h(\xi,\eta)$ is an impulse response function.

5. The method as claimed in claim 1, wherein the generating the hologram signal comprises generating a hologram signal on a virtual two-dimensional plane present between the object and the CGH plane, the hologram signal corresponding to all points included in the object, and
   wherein the sparsity is a number of dominant hologram signals among the hologram signals generated on the virtual two-dimensional plane, the dominant hologram signals satisfying a predetermined condition.

6. The method as claimed in claim 5, wherein the virtual two-dimensional plane is implemented with a lower resolution than a resolution of the CGH plane.

7. The method as claimed in claim 5, wherein the generating the hologram signal comprises:
   dividing all points included in the object into a plurality of clusters; and
   generating a hologram signal for each of the plurality of clusters in parallel on a corresponding region on the two-dimensional plane.

8. The method as claimed in claim 7, wherein the generating the hologram signal comprises:
generating the hologram signal based on the following equation:

$$u_{vp}(x, y) = \sum_{t=1}^{S} \sum_{i=1}^{N_t} \frac{A_t^i}{R_t^i} \exp(jkR_t^i),$$

where $R_t^i$ is a distance between the object and the virtual two-dimensional plane and is calculated as $R_t^i = \sqrt{(x-x_t^i)^2+(y-y_t^i)^2+(z_t^i)^2}$, x and y are coordinate values of the virtual two-dimensional plane, $x_t^i, y_t^i,$ and $z_t^i$ are coordinate values for an i-th point in a t-th cluster, k is a frequency of a reference light, and $A_t^i$ is an intensity of light at the i-th point present in the t-h cluster.

9. The method as claimed in claim 5, wherein the calculating the fringe pattern comprises calculating the fringe pattern by applying the following equation to at least a part of the hologram signal:

$$u(\xi, \eta) = \frac{\exp\left(j\frac{2\pi}{\lambda}z_2\right)}{j\lambda z_2} \int \int u_{VP}(x, y)\exp\left(j\frac{\pi}{\lambda z_2}((\xi - x)^2 + (\eta - y)^2)\right)dxdy \approx$$

$$\frac{\exp\left(j\frac{2\pi}{\lambda}z_2\right)}{j\lambda z_2} SF^{-1}[SF[u_{VP}(\xi, \eta)] \cdot SF[h(\xi, \eta)]],$$

where $Z_2$ is a distance between the virtual two-dimensional plane and the CGH plane, $u_{vp}$ (x,y) is a signal value of the virtual two-dimensional plane (x,y) coordinates, SF is a sparse Fourier transform formula, $SF^{-1}$ is a sparse Fourier inverse transform formula, ξ and η are CGH plane coordinate values, and h(ξ,η) is an impulse response function.

10. The method as claimed in claim 1, wherein the recording on the CGH plane comprises recording only a fringe pattern among the calculated fringe patterns on the CGH plane having an amplitude of a predetermined threshold or more.

11. A hologram generating apparatus, comprising:
a hologram signal generating unit configured to, based on light projected to a plurality of points corresponding to an object, generate a hologram signal corresponding to the plurality of points, the hologram signal being generated on at least one two-dimensional plane;
a processor configured to calculate a sparsity corresponding to one of the at least one two-dimensional plane based on the hologram signal, and to calculate a fringe pattern based on at least a portion of the hologram signal; and
a pattern writing unit configured to record the fringe pattern on a computer-generated holography (CGH) plane,
wherein the processor is further configured to repeatedly calculate a fringe pattern until a number of dominant signals of the calculated fringe pattern is greater than or equal to a predetermined threshold value determined based on the sparsity.

12. The apparatus as claimed in claim 11, wherein the hologram signal generating unit is further configured to divide the object into a plurality of depth layers and generate the hologram signal corresponding to a plurality of points, multiple sets of the plurality of points being included in the plurality of depth layers, the hologram signal being generated on the at least one two-dimensional plane corresponding to each of the plurality of depth layers, and
wherein the sparsity is a ratio of a number of points included in one of the plurality of depth layers to a total number of points included in the object.

13. The apparatus as claimed in claim 12,
wherein a first depth layer is provided a predetermined distance from an adjacent second depth layer, and
wherein the predetermined distance between the first depth layer and the second depth layer is determined based on a total number of points included in the object.

14. The apparatus as claimed in claim 12, wherein the processor is configured to generate the fringe pattern by applying the following equation to at least a part of the hologram signal:

$$u(\xi, \eta) =$$

$$\sum_{k=1}^{n} \frac{\exp\left(j\frac{2\pi}{\lambda}z_k\right)}{j\lambda z_k} \int \int u_k(x, y)\exp\left(j\frac{\pi}{\lambda z_k}((\xi - x)^2 + (\eta - y)^2)\right)dxdy \approx$$

$$\sum_{k=1}^{n} \frac{\exp\left(j\frac{2\pi}{\lambda}z_k\right)}{j\lambda z_k} SF^{-1}[SF[u_k(\xi, \eta)] \cdot SF[h(\xi, \eta)]],$$

where $Z_k$ is a distance between a k-th depth layer among the plurality of depth layers and a CGH plane, $u_k$ (x,y) is a signal value of a coordinate of the k-th depth layer (x,y) among the plurality of depth layers, SF is a sparse Fourier transform formula, $SF^{-1}$ is a sparse Fourier inverse transform formula, ξ and η are CGH plane coordinate values, and h(ξ,η) is an impulse response function.

15. The apparatus as claimed in claim 11, wherein the hologram signal generating unit is configured to generate a hologram signal on a virtual two-dimensional plane present between the object and the CGH plane, the hologram signal corresponding to all points included in the object, and
wherein the sparsity is a number of dominant hologram signals among the hologram signals generated on the virtual two-dimensional plane, the dominant hologram signals satisfying a predetermined condition.

16. The apparatus as claimed in claim 15, wherein the virtual two-dimensional plane is implemented with a lower resolution than a resolution of the CGH plane.

17. The apparatus as claimed in claim 15, wherein the hologram signal generating unit is configured to divide all points included in the object into a plurality of clusters and generate a hologram signal for each of the plurality of clusters in parallel on a corresponding region on the two-dimensional plane.

18. The apparatus as claimed in claim 17, wherein the hologram signal generating unit is configured to generate the hologram signal based on the following equation:

$$u_{vp}(x, y) = \sum_{t=1}^{S} \sum_{i=1}^{N_t} \frac{A_t^i}{R_t^i} \exp(jkR_t^i)$$

where $R_t^i$ is a distance between the object and the virtual two-dimensional plane and is calculated as $R_t^i = \sqrt{(x-x_t^i)^2+(y-y_t^i)^2+(z_t^i)^2}$, x and y are coordinate values of the virtual two-dimensional plane, $x_t^i, y_t^i$ and $z_t^i$ are coordinate values for an i-th point in a t-th cluster, k is a frequency of a reference light, and $A_t^i$ is an intensity of light at the i-th point present in the t-th cluster.

19. The apparatus as claimed in claim 15, wherein the processor is configured to calculate a fringe pattern by applying the following equation to at least some of the hologram signal:

$$u(\xi, \eta) = \frac{\exp\left(j\frac{2\pi}{\lambda}z_2\right)}{j\lambda z_2} \int\int u_{VP}(x, y)\exp\left(j\frac{\pi}{\lambda z_2}((\xi-x)^2+(\eta-y)^2)\right)dxdy \approx$$

$$\frac{\exp\left(j\frac{2\pi}{\lambda}z_2\right)}{j\lambda z_2} SF^{-1}[SF[u_{VP}(\xi, \eta)] \cdot SF[h(\xi, \eta)]],$$

where $Z_2$ is a distance between the virtual two-dimensional plane and the CGH plane, $u_{vp}$ (x,y) is a signal value of the virtual two-dimensional plane (x,y) coordinates, SF is a sparse Fourier transform formula, $SF^{-1}$ is a sparse Fourier inverse transform formula, $\xi$ and $\eta$ are CGH plane coordinate values, and $h(\xi, \eta)$ is an impulse response function.

20. A non-transitory recording medium storing a program for performing a method of generating a digital hologram of an object using a point cloud method, the method comprising:

projecting light to a plurality of points corresponding to the object;

generating a hologram signal corresponding to the plurality of points, the hologram signal being generated on at least one two-dimensional plane, the generating being based on the projected light;

calculating a sparsity corresponding to one of the at least one two-dimensional plane based on the hologram signal;

calculating a fringe pattern based on at least a portion of the hologram signal; and recording the fringe pattern on a computer-generated holography (CGH) plane, wherein the calculating the fringe pattern comprises repeatedly calculating the fringe pattern until a number of dominant signals of the calculated fringe pattern is greater than or equal to a predetermined threshold value determined based on the sparsity.

* * * * *